United States Patent
Epple et al.

(10) Patent No.: US 10,422,985 B2
(45) Date of Patent: Sep. 24, 2019

(54) OPTICAL IMAGING DEVICE AND IMAGING METHOD FOR MICROSCOPY

(71) Applicants: Carl Zeiss SMT GmbH, Oberkochen (DE); Carl Zeiss Laser Optics GmbH, Oberkochen (DE)

(72) Inventors: Alexander Epple, Aalen (DE); Holger Muenz, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 14/533,211

(22) Filed: Nov. 5, 2014

(65) Prior Publication Data

US 2015/0124075 A1    May 7, 2015

(30) Foreign Application Priority Data

Nov. 6, 2013  (DE) .................. 10 2013 112 212

(51) Int. Cl.
 *G02B 21/00* (2006.01)
 *G02B 21/02* (2006.01)
 (Continued)

(52) U.S. Cl.
 CPC .......... *G02B 21/025* (2013.01); *G02B 15/163* (2013.01); *G02B 21/04* (2013.01); *G02B 21/361* (2013.01); *G02B 21/365* (2013.01)

(58) Field of Classification Search
 CPC ............ G02B 17/0808; G02B 17/0856; G02B 17/0892; G02B 17/086; G02B 17/023;
 (Continued)

(56) References Cited

U.S. PATENT DOCUMENTS 3,679,286 A * 7/1972 Klein ............... G02B 15/173
359/677
4,832,465 A 5/1989 Arai et al.
(Continued)

FOREIGN PATENT DOCUMENTS

CN 102109671 B 6/2011
JP H 03-37610 A 2/1991
(Continued)

OTHER PUBLICATIONS

Japanese Office Action, with translation thereof, for corresponding Appl No. 2014-225362, dated Sep. 18, 2018.
(Continued)

*Primary Examiner* — Bumsuk Won
*Assistant Examiner* — Balram T Parbadia
(74) *Attorney, Agent, or Firm* — Fish & Richardson P.C.

(57) ABSTRACT

An optical zoom device for setting an imaging scale of an imaging device, which is configured for imaging an object on an image plane of an image recording device using a microscope objective, comprising an optical element arrangement is disclosed. The optical element arrangement includes an object-side zoom entrance for optical connection to an objective exit, in particular a collimated objective exit, of the microscope objective and includes an image-side zoom exit for optical connection to an image recording entrance of the image recording device. The optical element arrangement includes a tele arrangement designed according to the teleobjective principle, which includes a first optical element group with negative refractive power and a second optical element group with positive refractive power, assigned to the first optical element group for setting the imaging scale, wherein the first optical element group is arranged at the zoom exit and the second optical element (Continued)

group is arranged on the objective side of the first optical element group.

21 Claims, 11 Drawing Sheets

(51) Int. Cl.
    *G02B 21/04*     (2006.01)
    *G02B 15/163*     (2006.01)
    *G02B 21/36*     (2006.01)

(58) Field of Classification Search
    CPC .. G02B 17/0896; G02B 13/143; G02B 21/04; G02B 17/08; G02B 17/0852; G02B 21/0016; G02B 21/025; G02B 21/00; G03F 7/70225
    See application file for complete search history.

(56) References Cited

U.S. PATENT DOCUMENTS

| | | | |
|---|---|---|---|
| 5,031,976 A | 7/1991 | Shafer | |
| 5,157,552 A | 10/1992 | Hagimori | |
| 5,315,439 A * | 5/1994 | Ito | G02B 15/163 359/689 |
| 5,499,140 A * | 3/1996 | Betensky | G02B 23/00 359/656 |
| 5,715,096 A * | 2/1998 | Meyers | G02B 15/167 359/689 |
| 5,717,518 A | 2/1998 | Shafer et al. | |
| 5,831,772 A * | 11/1998 | Nishio | G02B 15/163 359/689 |
| 5,999,310 A * | 12/1999 | Shafer | G02B 17/0808 359/351 |
| 6,292,306 B1 * | 9/2001 | Betensky | G02B 13/22 359/663 |
| 6,473,243 B1 * | 10/2002 | Omura | G02B 17/0808 359/364 |
| 6,483,638 B1 * | 11/2002 | Shafer | G02B 17/023 359/351 |
| 7,012,759 B2 * | 3/2006 | Betensky | G02B 15/12 359/354 |
| 7,136,159 B2 | 11/2006 | Tsai et al. | |
| 7,218,453 B2 * | 5/2007 | Shafer | G02B 13/143 359/649 |
| 7,466,489 B2 * | 12/2008 | Beder | B82Y 10/00 355/53 |
| 7,672,043 B2 * | 3/2010 | Armstrong | G02B 17/0808 359/350 |
| 2004/0027688 A1 | 2/2004 | Lange | |
| 2004/0156118 A1 | 8/2004 | Kawasaki | |
| 2005/0152027 A1 | 7/2005 | Armstrong et al. | |
| 2005/0259330 A1 * | 11/2005 | Neil | G02B 13/14 359/676 |
| 2006/0158720 A1 * | 7/2006 | Chuang | G02B 17/0812 359/364 |
| 2006/0256429 A1 * | 11/2006 | Obrebski | G02B 3/14 359/380 |
| 2012/0307036 A1 * | 12/2012 | Yamamoto | G02B 21/025 348/79 |
| 2014/0313589 A1 * | 10/2014 | Winterot | G02B 13/22 359/663 |

FOREIGN PATENT DOCUMENTS

| | | |
|---|---|---|
| JP | 2001-517806 A | 10/2001 |
| JP | 2004-070092 A | 3/2004 |
| JP | 2007-531060 A | 11/2007 |
| JP | 2011-150299 A | 8/2011 |
| JP | 2012-252037 A | 12/2012 |
| JP | 62-039811 B2 | 11/2017 |

OTHER PUBLICATIONS

Japanese Office Action, with translation thereof, for corresponding JP Appl No. 2014-225362, dated May 28, 2019.

\* cited by examiner

OPTICAL IMAGING DEVICE AND IMAGING METHOD FOR MICROSCOPY

CROSS-REFERENCE TO RELATED APPLICATION

This application claims benefit under 35 U.S.C. § 119 of German Patent Application No. 10 2013 112 212.4, filed Nov. 6, 2013, the entire contents of which are incorporated by reference herein.

FIELD

The present disclosure relates to an optical zoom device for setting an imaging scale of an imaging device, an imaging device, an optical zoom method and an imaging method for microscopy. The disclosure can be applied in the context of inspecting any surfaces or bodies. In particular, it can be used in the context of inspecting microelectronic circuits.

BACKGROUND

In many technical fields, particularly in the field of microlithography, it is desirable, among other things, to subject bodies and the surfaces thereof to a rigorous optical inspection in order, for example, to be able to assess the quality of a production process and, where need be, to be able to intervene in a correcting manner should the inspection determine that predetermined quality criteria are not being met. Naturally, the same, or even more stringent, characteristics should be placed here on the precision of the imaging device used for the inspection when compared to the devices used in the production process of the body to be inspected.

In this context, the capability of the imaging device used for the inspection to process light of different wavelengths with the smallest possible aberrations is of particular importance in order to ensure a broad field of application for the imaging device. Thus, particularly in the context of production methods comprising an optical process, it is desirable or advantageous if the imaging device used for the inspection can process, with minimized aberrations, the wavelength range which is also used during the optical process. By way of example, this may be the wavelength range from 193 nm (the so-called VUV-range) to 436 nm (the so-called Hg g-line).

In this wavelength range, only a few optical materials still have a sufficient transparency, and so the systems are predominantly built from synthetic quartz glass ($SiO_2$) and fluorspar ($CaF_2$).

Here, the chromatic aberrations, i.e. the aberrations which are dependent on the wavelength of the light, are problematic. By way of example, if an imaging device with refractive optical elements (such as lens elements or the like) is used for the inspection, the aberrations of the imaging device are generally only minimized for a comparatively narrow wavelength range with a justifiable amount of outlay. A so-called achromatization of such a dioptric imaging device, i.e. of an imaging device only comprising refractive optical elements, that is to say an elimination of such chromatic aberrations, can hardly still be done with justifiable outlay over a broadband wavelength range (such as the aforementioned wavelength range).

Therefore, use is often made of so-called catadioptric imaging devices, which, in addition to refractive optical elements, also comprise reflective optical elements which are more expedient in respect of chromatic aberrations. By way of example, such catadioptric systems are known from U.S. Pat. No. 5,031,976 (Shafer), U.S. Pat. No. 5,717,518 (Shafer et al.), US 2004/0027688 A1 (Lange) and U.S. Pat. No. 7,136,159 B2 (Tsai et al.), the entire disclosures of which are respectively included herein by reference.

In the context of wafer inspection, US 2004/0027688 A1 (Lange) has disclosed a high aperture (numerical aperture NA greater than 0.9), strongly magnifying catadioptric microscope objective, which images an object at infinity, wherein the image is broadband, i.e. corrected over a large range of wavelengths. Here, in one variant, an optical element group adjoins the microscope objective, which optical element group initially generates an intermediate image before the light is subsequently collimated again and fed to a zoom group with positive refractive power. A problem in this zoom system is that, in the case of a compact design, only comparatively small maximum focal lengths and therefore comparatively small maximum magnifications (and consequently only a comparatively small extension of the imaging scale) can be realized.

In the context of wafer inspection, U.S. Pat. No. 7,136,159 B2 (Tsai et al.) describes a high aperture (numerical aperture NA up to 0.99), strongly magnifying catadioptric microscope objective with a planarized image field. The microscope objective images an object at infinity, wherein the image is broadband, i.e. corrected over a large range of wavelengths. The collimated light beam from the microscope objective is then imaged with high magnification on a detector via a non-telecentric tube optical unit. In one variant, there is a variation of the imaging scale with an extension of approximately 3× (variation of the magnification from 36× to 100×) by changing the position of the detector (arranged in the non-telecentric beam path) and subsequent focusing. Consequently, this realizes a simple zoomable tube optical unit, in which, however, the system length of the overall system varies significantly depending on the set magnification.

In a further variant with the same extension (variation of the magnification from 36× to 100×), U.S. Pat. No. 7,136,159 B2 (Tsai et al.) shows a generic zoom system which images the collimated exit of the microscope objective onto a detector with zoomable imaging scale. What is shown here is a two-member zoom system or tele system, designed according to the teleobjective principle, with an object-side element group with positive refractive power and an image-side element group with negative refractive power, which vary the imaging scale. Here, a fixed installation length of the zoom system is achieved by displacing both element groups.

A problem here is that the Petzval sum, which is representative for the image field curvature, of such a tele system cannot be corrected; consequently, the tele system provides a strongly over-correcting contribution to the Petzval sum of the overall system. Here, this effect increases with an increasingly more compact design and/or with increasing magnification. However, in many cases it is desirable to design the optical interface between the microscope objective and the zoom system in an aberration-free and collimated manner, and so such a tele system, despite being able to achieve advantageously high magnifications, cannot in a simple manner realize the desired broadband freedom from aberration at a compact design.

SUMMARY

Therefore, the present disclosure is based on the object of providing an optical zoom device for setting an imaging scale of an imaging device, an imaging device, an optical zoom method and an imaging method for microscopy, which do not have the aforementioned disadvantages, or at least only have them to a lesser extent, and, in particular, with a compact design and high achievable magnifications, enable broadband-corrected imaging in a simple manner.

The present disclosure is based on the insight that, at a compact design and high achievable magnifications, broadband-corrected imaging is made possible in a simple manner if the zoom system comprises a third optical element group with positive refractive power, disposed upstream of the first and second optical element groups, which third optical element group generates a real intermediate image in the zoom system. This third optical element group renders it possible to correct the Petzval sum of the zoom system, and therefore possibly even to let it be zero for the overall zoom system, such that an optical connection to an optionally aberration-free and/or collimated microscope objective is readily possible.

Moreover, the design of the first and second optical element groups in this case in a simple manner allows the realization of large maximum focal lengths with a compact design. Therefore, high magnifications and high extensions of the imaging scale can be easily realized.

Hence, in accordance with one aspect, the present disclosure relates to an optical zoom device for setting an imaging scale of an imaging device, which is configured for imaging an object on an image plane of an image recording device using a microscope objective, comprising an optical element arrangement, wherein the optical element arrangement comprises an object-side zoom entrance for optical connection to an objective exit, in particular a collimated objective exit, of the microscope objective and comprises an image-side zoom exit for optical connection to an image recording entrance of the image recording device. The optical element arrangement comprises a tele arrangement designed according to the teleobjective principle, which comprises a first optical element group with negative refractive power and a second optical element group with positive refractive power, assigned to the first optical element group for setting the imaging scale, wherein the first optical element group is arranged at the zoom exit and the second optical element group is arranged on the objective side of the first optical element group. The optical element arrangement furthermore comprises a third optical element group with positive refractive power arranged at the zoom entrance, which third optical element group is configured to generate a real intermediate image in the zoom device. The intermediate image is preferably arranged between the third optical element group and the second optical element group.

It is noted here that all optical element groups mentioned herein may, in principle, comprise merely a single optical element. Typically, at least individual ones of the element groups comprise an arbitrary plurality of optical elements. In principle, this may be any type of optical element (refractive, reflective, diffractive) and any combinations of optical elements of different types. The optical elements of the individual element groups may also be manufactured from different materials, wherein refractive elements in particular are preferably manufactured from synthetic quartz glass ($SiO_2$) and fluorspar ($CaF_2$). Consequently, the optical elements of the optical element arrangement can be manufactured at least in part, preferably predominantly, more preferably completely, from quartz glass ($SiO_2$) and/or the optical elements of the optical element arrangement can be manufactured at least in part, preferably predominantly, more preferably completely, from fluorspar ($CaF_2$). Naturally, these two materials (individually or in combination) may be exclusively used for the optical elements of the individual element groups.

In principle, the imaging scale can be set in any suitable manner via the optical elements of the zoom device. Thus, firstly, the first optical element group and/or the second optical element group may, for setting the imaging scale, be arranged displaceably along an optical axis of the optical element arrangement.

By way of example, herein, a movement of the second optical element group relative to the intermediate image may lead to a variable post-magnification of the intermediate image in a further intermediate image, which is then picked up by the first optical element group and, once again in turn, imaged on the image recording device with post-magnification.

If the distance between the first optical element group and the image recording device is fixedly selected in a pairing, the imaging scale is preferably set by varying this pairing and the second optical element group along the optical axis, wherein substantially the whole extension of the system is provided by the variation of the second optical element group. Here, the axial distance between first and second element groups then, in principle, is variable in order to be able to set the imaging scale.

In principle, the first and second optical element groups can be arranged in a pairing with a fixed axial distance and can, for setting the imaging scale, be displaced together axially. In order to be able to correct occurring aberrations in an improved manner, provision can however also be made for adjusting the distance between the first and second optical element groups by virtue of these being arranged displaceably relative to one another.

In principle, the third optical element group can be arranged at a fixed position along the optical axis. However, for setting the imaging scale, provision can likewise also be made for the third optical element to be arranged displaceably along the optical axis. As a result, it is possible, particularly in the case of a collimated exit of the microscope objective, to achieve a constant installation length of the imaging device in a simple manner.

The third optical element group can be displaced together with the first optical element group and/or the second optical element group, wherein the respective pairwise distance between the optical element groups may eventually be adjustable (in particular for aberration correction).

In principle, the intermediate image can be arranged at any location within the zoom device. The intermediate image is preferably arranged in the region of the second optical element group, particularly on the object side of the second optical element group. Additionally or alternatively, the intermediate image can be arranged between the third optical element group and the second optical element group, in particular with a substantially unchanging distance ratio. In both cases, it is comparatively simple to deal with the movements of the first and/or second optical element groups in the case of zoom processes.

As mentioned previously, the first optical element group can be arranged along the optical axis of the optical element arrangement at a substantially constant distance from the image recording device. Here, the pairing made of the image recording device and the first optical element group may also, as a matter of principle, be arranged in a stationary manner. However, for setting the imaging scale, the pairing is preferably configured in a displaceable manner.

In further variants of the disclosure, the third optical element group can be arranged along the optical axis of the optical element arrangement at a substantially constant distance from the microscope objective, as a result of which, in general, a stationary intermediate image arises. Here, eventually, smaller relative movements may be provided in order to correct aberrations.

The imaging scale can then be set by moving the first and/or second optical element groups and, eventually, also moving the image recording device. This variant is advantageous in that manipulations can be undertaken and/or additional beam paths can be coupled-in or coupled-out in the region of the at least substantially stationary intermediate image. Thus, as a result of this it is possible, for example, to integrate an autofocus system into the beam path and/or to implement measuring devices for exposure monitoring.

In further preferred variants of the disclosure, the optical element arrangement comprises a fourth optical element group which preferably has positive refractive power. Here, the fourth optical element group is arranged between the third optical element group and the second optical element group. Here, this renders it possible, in particular in a simple manner, to leave the intermediate image substantially stationary and once again set the imaging scale via the first and/or second optical element group. Therefore, the third optical element group and/or the fourth optical element group are preferably arranged along the optical axis of the optical element arrangement at a substantially constant distance from the microscope objective. Consequently, the fourth optical element group in these variants ensures imaging of the system pupil in the actual zoom system of the first and/or second optical element group, which in turn realize the extension of the imaging.

In principle, the intermediate image here can be arranged at any location. The intermediate image is preferably arranged between the third optical element group and the fourth optical element group, wherein the intermediate image is preferably arranged closer to the fourth optical element group, in particular in the region of the fourth optical element group.

In addition to the aforementioned imaging of the system pupil, the fourth optical element group arranged near the intermediate image may also assume important tasks when correcting the secondary spectrum of the chromatic focus variation. Thus, what may be the case in specific variants of the disclosure is that the (possibly collimated) light beam from the microscope objective is imaged with strong longitudinal chromatic aberration in the intermediate image such that the beam heights of the marginal rays on the fourth optical element group vary strongly as a function of the light wavelength.

On the other hand, the contribution of a lens element to the overall correction of the longitudinal chromatic aberration is proportional to the refractive power of the lens element, the dispersion of the utilized material and the square of the marginal ray height of the passing light beam. Therefore, what can be achieved by a strong longitudinal chromatic aberration of the intermediate image is that the marginal ray height at the location of the fourth optical element group varies significantly with the light wavelength such that the contribution of the fourth optical element group to the longitudinal chromatic aberration of the overall system differs significantly at various wavelengths. In preferred variants of the disclosure, this effect is used in a targeted manner by a suitable selection of the optical parameters of the fourth optical element group in order to correct higher-order chromatic aberrations.

Therefore, in preferred variants of the disclosure, the intermediate image has a pronounced longitudinal chromatic aberration, in particular of higher order, while the fourth optical element group is configured for at least partial correction, in particular substantially complete correction, of the longitudinal chromatic aberration of the intermediate image.

As already explained above, the present disclosure renders it possible to correct the image field curvature (i.e., consequently, the Petzval sum) of the zoom device and/or of the whole imaging device made of microscope objective and zoom device despite a pronounced tele design of the first and second optical element groups; i.e., consequently, it is possible to achieve an at least substantially planar image field in the region of the image recording device. This was predominantly achieved by forming an intermediate image by the positive refractive power of the third optical element group and, where applicable, of the fourth optical element group. If the microscope objective already supplies a planar image field at the objective exit thereof, provision is preferably made for the Petzval sum for the optical elements of the optical element arrangement to be at least approximately equal to zero, preferably substantially equal to zero.

If this is not the case, provision is preferably made for an at least substantially planar image field to then be present at the zoom exit; i.e., consequently, for the Petzval sum for the optical elements of the imaging device made of microscope objective and zoom device to be at least approximately equal to zero, preferably substantially equal to zero.

With the present disclosure, it is possible to obtain, in principle, arbitrary extensions of the image (within the scope of what is technically possible). Preferably, the attainable extension when setting the imaging scale is 3× to 10×, preferably 5× to 9×, more preferably 6× to 8×. However, it is understood that in further variants of the disclosure, greater extensions (in particular extensions D>10×) can also be attained.

Likewise, with the present disclosure, it is possible to obtain, in principle, arbitrarily sized focal length ranges (within the scope of what is technically possible). Preferably, the attainable focal length range when setting the imaging scale is 1 m to 30 m, preferably 2 m to 25 m, more preferably 2.5 m to 20 m.

Furthermore, despite the large extensions and the large focal length ranges and magnifications, comparatively compact embodiments for the zoom system, optionally with constant installation length, can be realized with the present disclosure. In preferred variants of the disclosure, the element arrangement has an installation length, in particular a constant installation length, of 1 m to 3 m, preferably 1.5 m to 2.5 m, more preferably 1.8 m to 2.0 m, along an optical axis of the optical element arrangement. Therefore, the tele factor, i.e. the ratio of focal length to installation length, may assume values of significantly greater than 1 or greater than 5 or greater than 10, respectively.

The present disclosure furthermore relates to an optical imaging device for microscopy, comprising an imaging unit, which comprises a microscope objective and an optical zoom device according to the disclosure, and an image recording device, wherein the imaging unit is configured for imaging an object (assigned to the objective entrance of the microscope objective) onto an image plane of the image recording device.

Here, the microscope objective can, in principle, be configured in any suitable manner. The microscope objective is preferably configured as a catadioptric objective since such objectives have particularly expedient properties in respect of aberration correction.

Use is preferably made of high aperture microscope objectives. Therefore, the microscope objective, on the object side, preferably has a numerical aperture which is greater than 0.8, preferably greater than 0.85, more preferably approximately 0.9.

Furthermore, the microscope objective, on the object side, preferably has a field radius which is greater than 0.2 mm, preferably greater than 0.5 mm, more preferably 0.7 mm to 1.0 mm. Additionally or alternatively, the microscope objective, on the object side, has an etendue (i.e. a product of the numerical aperture and field radius) which is greater than 0.3, preferably greater than 0.4, more preferably 0.7 to 1.0 or more.

In particularly expedient variants of the disclosure, the microscope objective has a further, in particular substantially stationary, intermediate image. Additionally or alternatively, the microscope objective, at the objective exit thereof, has an at least substantially collimated optical connection to the optical zoom device. In addition to the particularly simple embodiment of the optical interface with the zoom device, this has, in particular, advantages in respect of setting the imaging scale in the zoom device since the third optical element group can, eventually, be easily configured in a displaceable manner.

In certain variants of the disclosure, the objective exit of the microscope objective, in terms of the aberrations thereof, has an at least substantially corrected optical connection to the optical zoom device. This corrected objective exit can be advantageous to the extent that it realizes a standardized optical interface for arbitrary zoom devices.

However, in other variants of the disclosure, it may also be provided that the objective exit of the microscope objective, in terms of the aberrations thereof, has an uncorrected optical connection to the optical zoom device. This can be advantageous to the extent that the outlay for correcting the microscope objective is reduced and the correction is moved into the zoom device, where this may possibly be easier to realize.

Preferably, the first optical element group is the last optical element group upstream of the image recording device, in particular upstream of the image plane of the image recording device. Here, it is understood that, in certain variants of the disclosure, it may be provided that the image plane at the zoom exit is imaged once again on the actual image acquisition device, for example a detector or the like, by further optical elements of the image recording device. However, the actual image acquisition device (e.g. a detector etc.) is preferably arranged in the region of the image plane at the zoom exit. Consequently, an image detector surface of an image detector of the image recording device is therefore preferably arranged in the region of the image plane of the image recording device.

Preferably, the imaging device is a broadband-corrected imaging device. Therefore, the imaging device, in terms of its aberrations, is preferably corrected over a bandwidth of at least 40 nm, preferably of at least 60 nm, more preferably 70 nm to 100 nm. In principle, the imaging device can be used for any wavelength. Preferably, the operational wavelength of the imaging device comprises at least a part of the vacuum ultraviolet radiation (VUV). Therefore, the imaging unit, in terms of its aberrations, is preferably corrected in an operational wavelength range from 180 nm to 400 nm, preferably from 185 nm to 370 nm, more preferably from 190 nm to 260 nm.

The imaging scale of the imaging unit and the variation thereof can, in principle, be selected to be arbitrarily large.

Preferably, the imaging unit has an imaging scale of 40× to 1000×, preferably 80× to 900×, more preferably 100× to 800×.

The present disclosure furthermore relates to an optical zoom method for setting an imaging scale of an imaging process, in which an object is imaged on an image plane of an image recording device using a microscope objective. In this zoom method, an optical element arrangement, with an object-side zoom entrance, is connected optically to an objective exit, in particular a collimated objective exit, of the microscope objective and, with an image-side zoom exit, is connected optically to an image recording entrance of the image recording device. A tele arrangement, designed according to the teleobjective principle, of the optical element arrangement is used for setting the imaging scale, wherein the tele arrangement comprises a first optical element group with negative refractive power and a second optical element group with positive refractive power, assigned to the first optical element group for setting the imaging scale, wherein the first optical element group is arranged at the image-side zoom exit and the second optical element group is arranged on the objective side of the first optical element group. A real intermediate image is generated in the region of the optical element arrangement by a third optical element group with positive refractive power, which third optical element group is part of the optical element arrangement and arranged at the zoom input. The intermediate image is preferably arranged between the third optical element group and the second optical element group.

In accordance with a further aspect, the present disclosure relates to an imaging method for microscopy, in which an image of an object on an image plane of an image recording device is generated by a microscope objective and an associated optical element arrangement, wherein an imaging scale of the image is set using an optical zoom method according to the disclosure.

Using the zoom method according to the disclosure or the imaging method according to the disclosure, it is possible to realize the variants and advantages, described above in the context of the zoom device according to the disclosure and of the imaging device according to the disclosure, to the same extent and so, in this respect, reference is explicitly made to the explanations given above.

Further preferred embodiments of the disclosure become apparent from the dependent claims or the subsequent description of preferred exemplary embodiments, which refers to the attached drawings.

DETAILED DESCRIPTION

First Embodiment

With reference to FIGS. 1 to 5, the following text describes a first preferred embodiment of an optical imaging device according to the disclosure, in the form of a microscope 101, comprising a preferred embodiment of the optical zoom device according to the disclosure, by which a preferred embodiment of the imaging method according to the disclosure can be performed using the zoom method according to the disclosure.

In order to understand the following explanations more easily, an orthogonal xyz-coordinate system has been introduced in the figures, in which the z-coordinate coincides with the direction of gravity. However, it is understood that any other alignment of the components of the imaging device may be selected in other variants of the disclosure.

In the present example, the microscope 101 is used for inspecting the structures (which, for example, were produced by an optical process) formed on a substrate 103.1. However, it is understood that, in other variants of the disclosure, the microscope according to the disclosure can be used for an imaging process in conjunction with any other application, in particular in conjunction with inspecting any other bodies, substrates, surfaces or liquids, etc.

Figure 1:
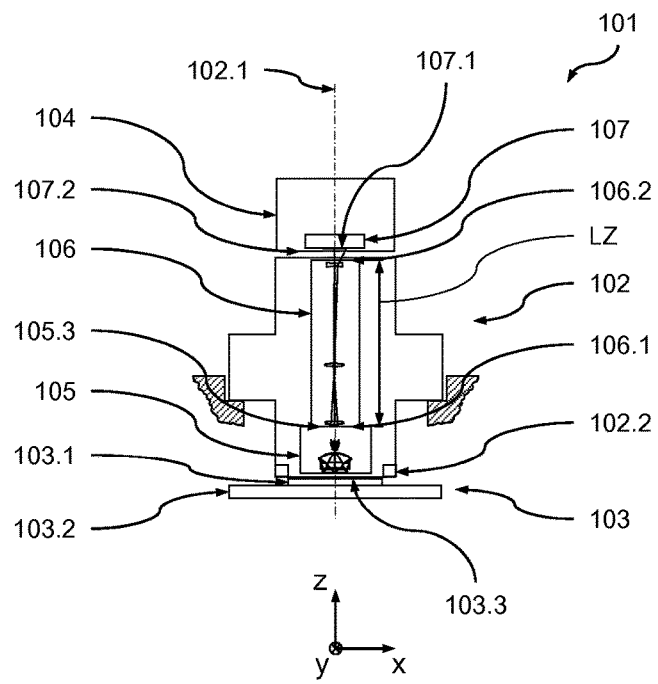
FIG. 1 is a schematic illustration of a preferred embodiment of an optical imaging device according to the disclosure, comprising a preferred embodiment of the optical zoom device according to the disclosure, by which a preferred embodiment of the imaging method according to the disclosure can be performed using the zoom method according to the disclosure.
Figure 2:
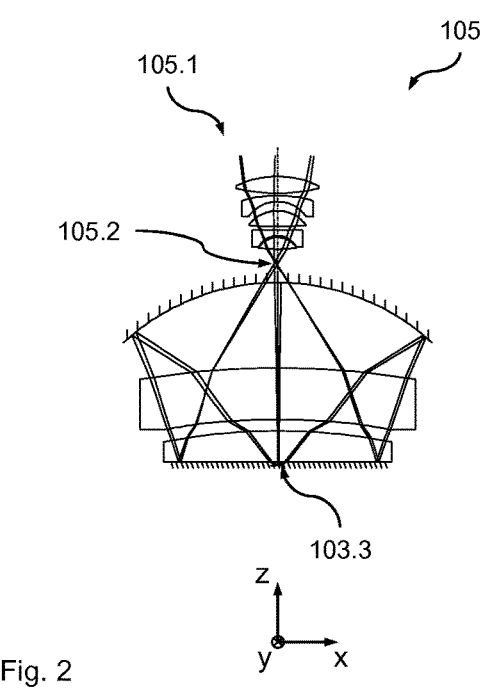
FIG. 2 is a schematic view of part of the microscope objective of the optical imaging device from FIG. 1.

FIG. 1 shows a schematic illustration of the microscope 101, which comprises an optical imaging unit 102 (with an optical axis 102.1 and an illumination system 102.2), a substrate device 103 and an image recording device 104. The illumination system 102.2 illuminates (by way of an optical waveguide device not shown in any more detail) the substrate 103.1, which is arranged on a substrate stage 103.2 of the substrate device 103, using an imaging light beam (not depicted here). The imaging unit 102 comprises a microscope objective 105 and a zoom device 106 according to the disclosure adjoining the latter.

Structures to be inspected are situated in a so-called object plane 103.3 on the surface of the substrate 103.1 facing the imaging unit 102, which structures to be inspected, via the imaging light beam, are imaged on an image plane 107.1 of an image sensor 107 of the image recording device 104 via the optical elements of the microscope objective 105 and of the zoom device 106 arranged in the imaging unit 102. The data obtained from the signals from the image sensor 107 are then used in a conventional manner for inspecting the surface of the substrate 103.1.

The microscope 101 is a broadband-corrected imaging device which is corrected in an operational wavelength range from 190 nm to 260 nm, that is to say, consequently, over a bandwidth of approximately 60 nm. The imaging scale MOB of the microscope 101 (from the object plane 103.3 to the image plane 107.1) can be varied from MOB=100× to MOB=800× in this case. Consequently, an 8-fold extension (i.e. D=8×) of the imaging can therefore be obtained in the present example.

In the present example, the microscope objective 105 is a catadioptric high aperture objective which, on the object side, has a numerical aperture of NA=0.9. Furthermore, the microscope objective 105, on the object side, has a field radius FR which, in the present example, is FR=0.5 mm, and so an etendue E (i.e. a product of the numerical aperture NA and field radius FR) of E=0.45 emerges. The microscope objective 105 has a pupil-obscured optical system 105.1 corrected in respect of the aberrations and with a real intermediate image 105.2, which images the object plane 103.3 at infinity. Consequently, the microscope objective 105 therefore provides a corrected and collimated optical interface at its objective exit 105.3.

The optical zoom device 106 with the object-side zoom entrance 106.1 thereof is connected to this collimated optical interface at the objective exit 105.3. Here, the zoom device 106 serves for setting an imaging scale M of the imaging device 102, as will still be explained in more detail below. The image recording entrance 107.2 of the image recording device 107 is optically connected to the image-side zoom exit 106.2 the zoom device 106.

Figure 4:
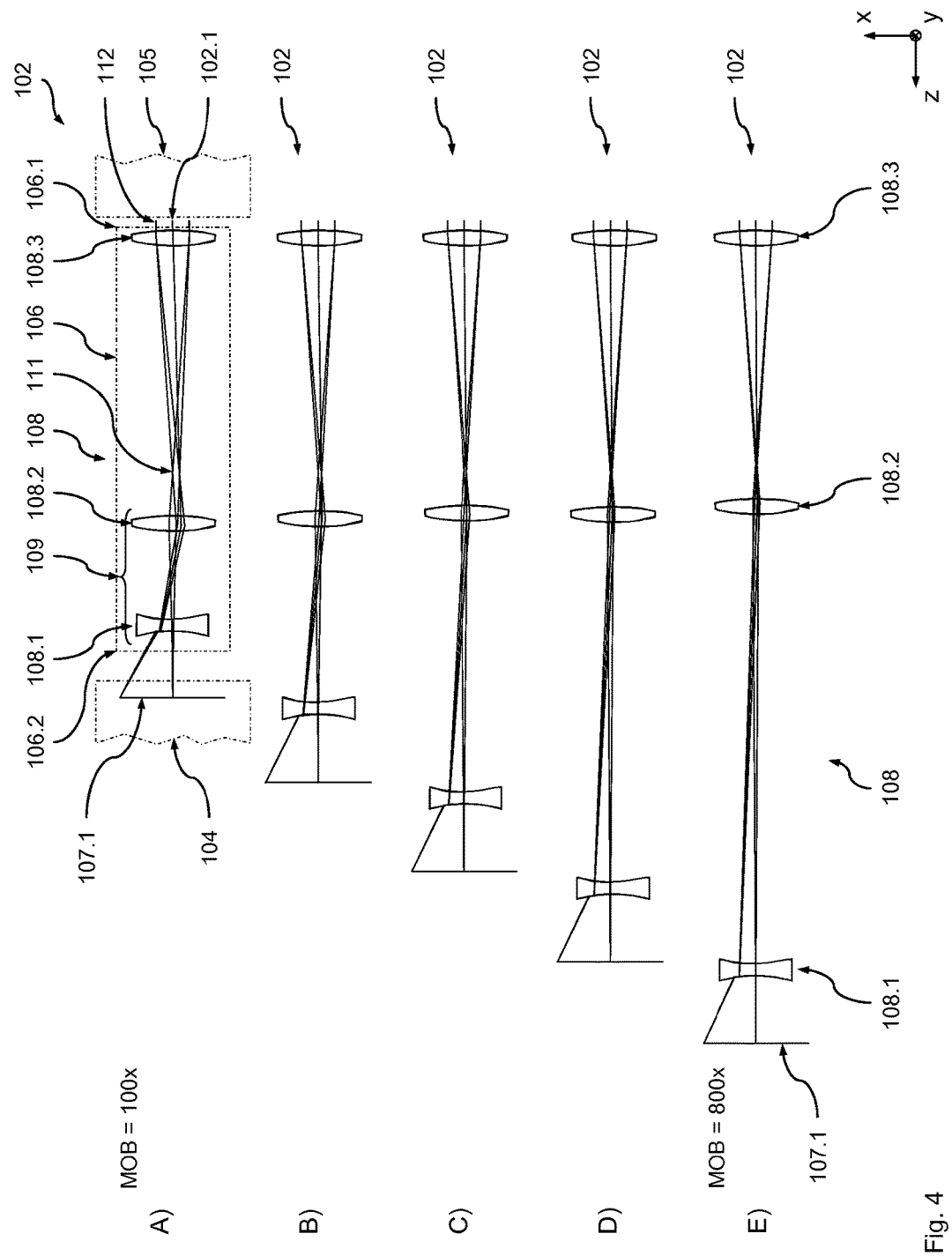
FIG. 4 is a schematic illustration of the zoom device from FIG. 1.

As can be seen, in particular, from FIG. 4 (which shows a paraxial optical equivalent diagram of the optical system of the zoom device 106), the zoom device 106 comprises an optical element arrangement 108. The optical element arrangement 108 comprises a tele arrangement 109, which is designed according to the teleobjective principle and which comprises a first optical element group 108.1 with negative refractive power and a second optical element group 108.2 with positive refractive power.

The first optical element group 108.1 and the second optical element group 108.2 are assigned to one another for setting the imaging scale MOB, wherein the first optical element group 108.1 is arranged at the zoom exit 106.2 of the zoom device 106 and the second optical element group 108.2 is arranged on the objective side of the first optical element group 108.1. The optical element arrangement 108 furthermore comprises a third optical element group 108.3 with positive refractive power arranged at the zoom entrance 106.1, which third optical element group is configured to generate a real intermediate image 111 in the zoom device 106.

Via the third optical element group 108.3 disposed upstream of the first optical element group 108.1 and of the second optical element group 108.2, it is advantageously possible to correct the Petzval sum PS of the zoom device 106, i.e. let it equal zero for the whole zoom device 106 (i.e. PS=0) eventually, such that the optical connection to the aberration-free and collimated microscope objective 105 is readily possible and leads to a plane image field in the region of the image plane 107.1, respectively.

The design of the first and second optical element groups 108.1, 108.2 as a tele arrangement 109 moreover, in a simple manner, enables the realization of large maximum focal lengths at a compact design. Therefore, high magnifications MOB and high extensions D of the imaging scale can be realized in a simple manner. In the present example, the focal length range of the zoom device 106 is 2.5 m to 20 m, wherein the maximum axial length LZ of the zoom device 106 (along the optical axis 102.1) is LZ=2 m.

As can be seen from FIG. 4, which in parts A to E thereof respectively shows different settings for five different imaging scales increasing from A (MOB=100×) to E (MOB=800×), from the collimated light beam 112 of the microscope objective 105 and by the stationary third optical element group 108.3, the intermediate image 111 is generated in the present example, which is imaged by the tele arrangement 109 on the image plane 107.1 of the image sensor 107. The imaging scale MOZ from the object plane 103.3 to the intermediate image 111 is constant in this case due to the stationary third optical element group 108.3.

In the present example, the imaging scale MOB from the object plane 103.3 to the image plane 107.1 is set by an axial displacement (in the z-direction) of both the first optical element group 108.1 and the second optical element group 108.2 along the optical axis 102.1.

Here, a movement of the second optical element group 108.2 relative to the intermediate image 111 leads to a variable post-magnification of the intermediate image 111 in a further intermediate image, which is then picked up by the first optical element group 108.1 and, in turn, imaged, with post-magnification again, on the image plane 107.1 of the image recording device 104.

As can be seen from FIG. 4, in the present example, the distance between the first optical element group 108.1 and the image plane 107.1 is fixedly selected in a pairing of these components, and so the imaging scale MOB setting is obtained by varying this pairing and the second optical element group 108.2 along the optical axis 102.1. Here, substantially the whole extension (D=8×) of the system is achieved by variation of the second optical element group 108.2, which is arranged in the vicinity of the intermediate image 111, wherein the intermediate image 111 in the present example is arranged on the object side of the second optical element group 108.2.

The substantially axially fixed arrangement of the third optical element group 108.3, and therefore of the intermediate image 111, is advantageous in that manipulations can be undertaken and/or additional beam paths can be coupled-in or coupled-out in the region of the intermediate image 111. Thus, as a result, it is possible, for example, to integrate an autofocus system into the beam path and/or to implement measuring devices for exposure monitoring.

In the present example, the optical element groups 108.1, 108.2 and 108.3 are respectively made up of a plurality of lens elements, i.e. refractive optical elements. In this case, all optical elements of the optical element groups 108.1, 108.2 and 108.3 are manufactured from quartz glass ($SiO_2$) or fluorspar ($CaF_2$). However, it is understood that, in other variants of the disclosure, any other types (reflective, diffractive) of optical elements and arbitrary combinations of optical elements of different types can be used additionally or alternatively.

Figure 5:
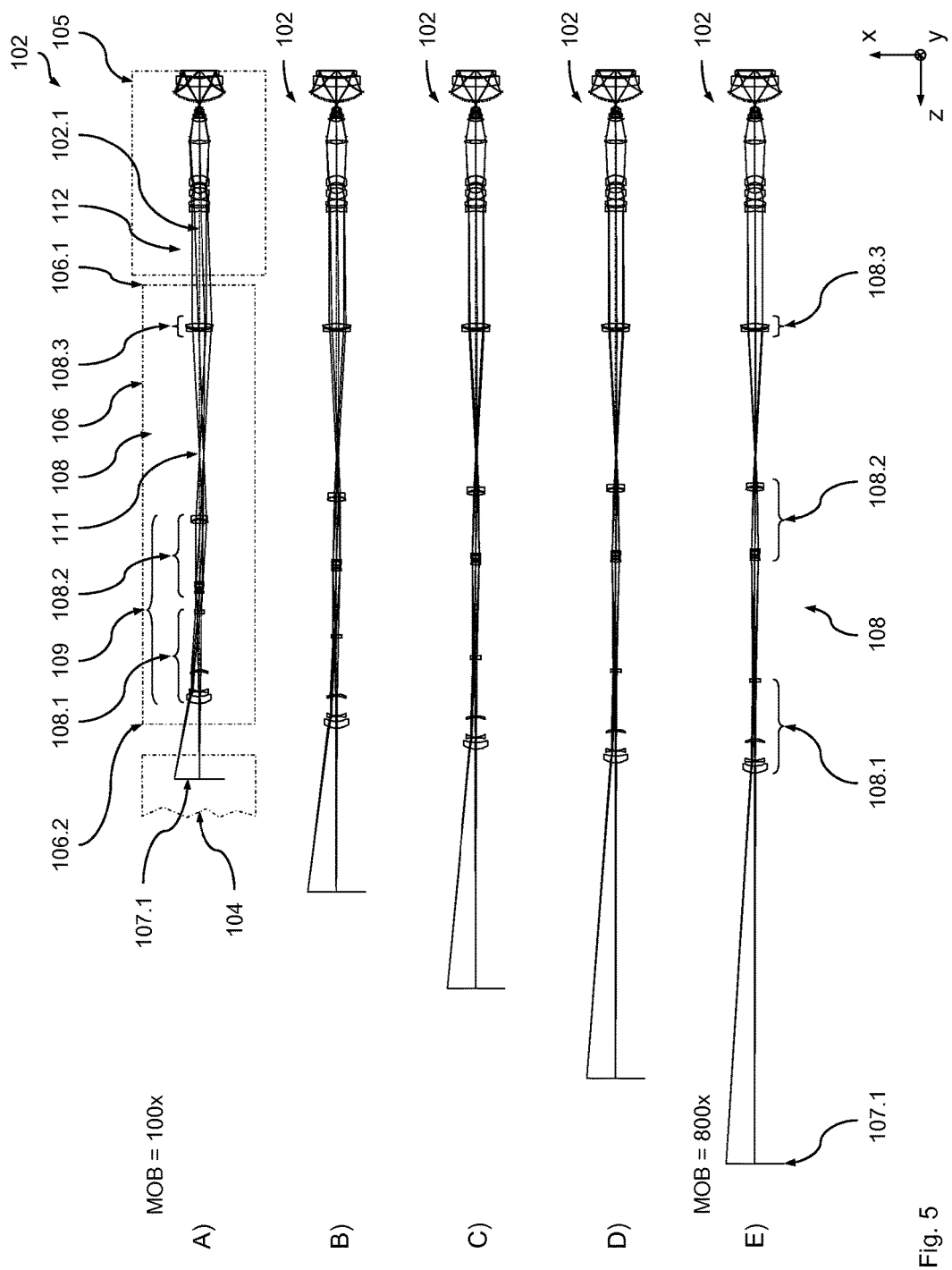
FIG. 5 is a schematic illustration of a preferred specific realization of the zoom device from FIG. 4.
Figure 6:
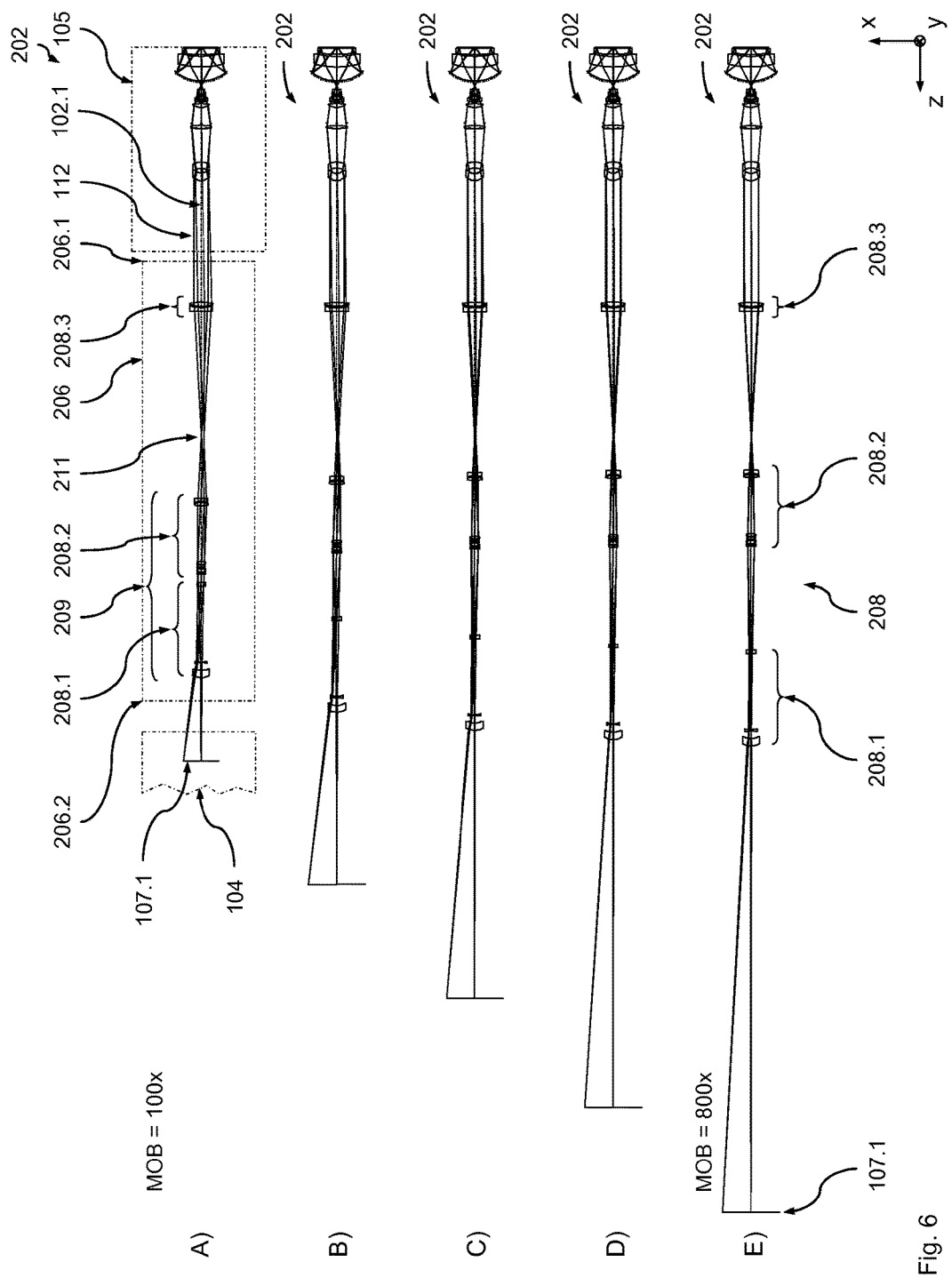
FIG. 6 is a schematic illustration of a further preferred specific realization of the zoom device from FIG. 4.
Figure 7:
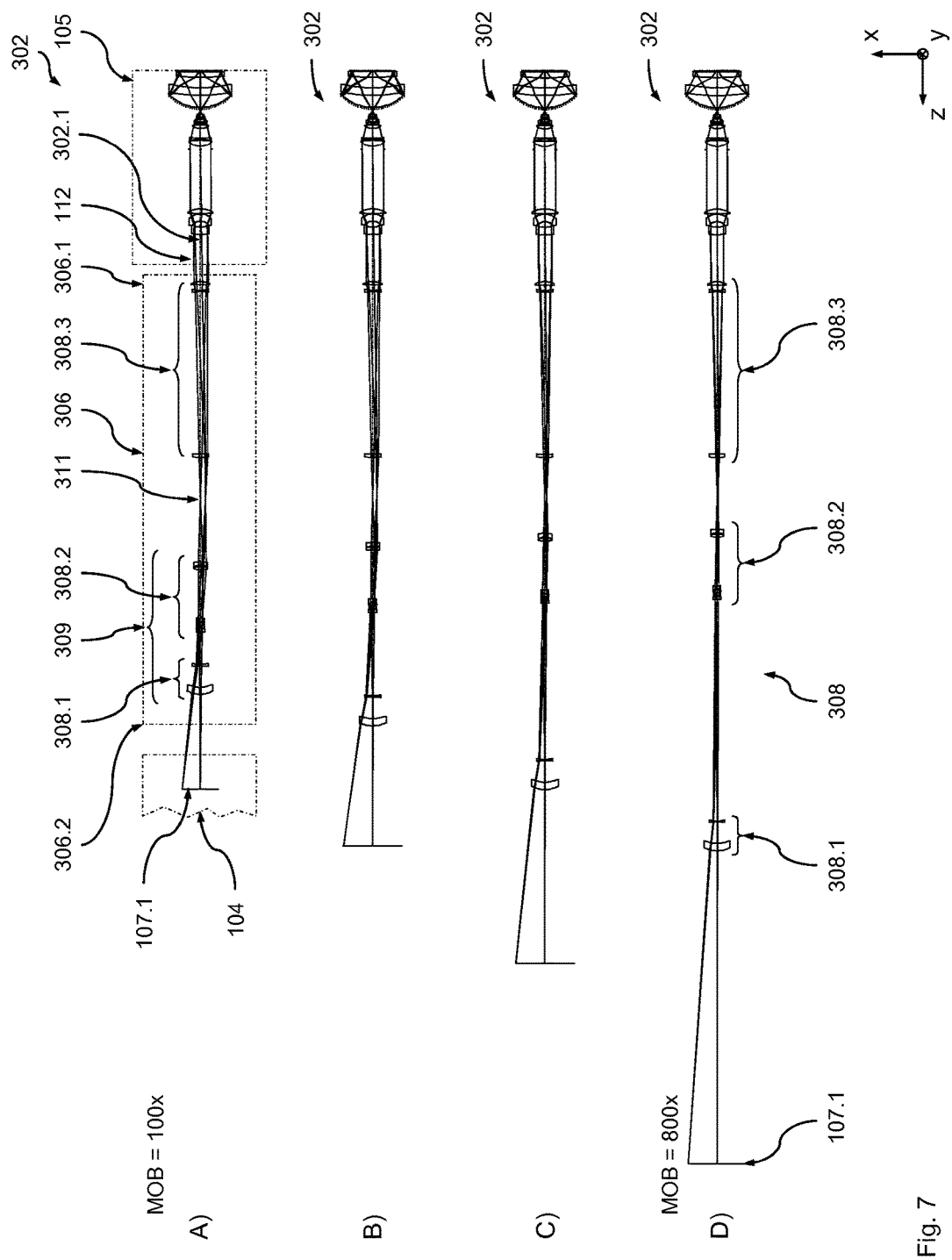
FIG. 7 is a schematic illustration of a further preferred specific realization of the zoom device from FIG. 4.

FIG. 5 shows a specific, slightly modified realization of the paraxial design of the imaging unit 102 from FIG. 4. The modification consists in that (compared to the pure paraxial approach in FIG. 4) the distance between the first optical element group 108.1 and the image plane 107.1 also is configured in a variable manner in order to be able to better correct possible aberrations.

Figure 3:
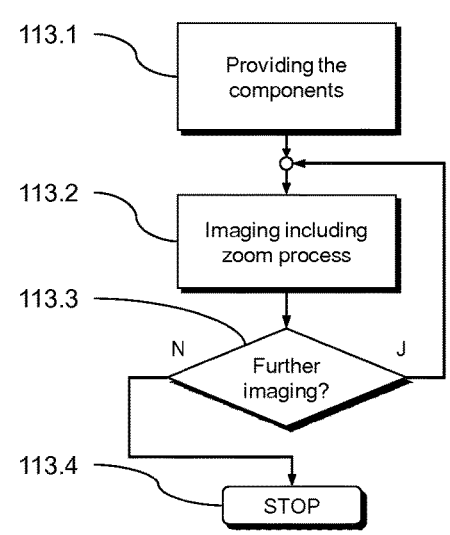
FIG. 3 is a block diagram of a preferred embodiment of the imaging method according to the disclosure, which can be performed using a preferred embodiment of the zoom method according to the disclosure using the imaging device from FIG. 1.

FIG. 3 shows a flow chart of a preferred variant of an imaging method according to the disclosure, which is performed with the microscope 101 using a preferred variant of a zoom method according to the disclosure.

First of all, in step 113.1, the components of the microscope 101 are made available and positioned in a manner as described above.

In step 113.2, the substrate 103.1 is illuminated with the imaging light beam by the illumination device 102 and the corresponding regions on the surface of the substrate 103.1 are then imaged on the sensor surface of the image sensor 110 by the imaging unit 102, as described above. The imaging scale MOB is set before, during or after the imaging in this case, as described in detail above.

In step 113.3, a check is then carried out as to whether a further imaging process is to take place. If this is the case, there is a return to step 113.2. Otherwise, the method process is completed in step 113.4.

Second and Third Embodiment

Further preferred embodiments of the imaging device 101 according to the disclosure with a further preferred embodiment of the zoom device 206 or 306 according to the disclosure, by which the methods according to the disclosure can be realized, are respectively described in the following with reference to FIGS. 1 to 3 and 6 and 7, respectively. The zoom device 206 or 306 can in each case be used in the imaging device 101 instead of the zoom device 106. In the basic design and functionality thereof, the respective zoom device 206 and 306 corresponds to the zoom device 106, and so the following text mainly discusses the differences. Similar components are provided here with a reference sign, the value of which has been increased by 100 and 200, respectively. To the extent that no other explanations in relation to the properties and advantages of these components are provided in the following, reference is explicitly made to the aforementioned explanations in respect of the first embodiment.

The difference between the zoom device 206 and the zoom device 106 consists in the field radius FR being reduced; otherwise, the system specifications are identical. This leads to a simplified system design with a reduced number of optical elements in the area of the first optical element group 208.1.

The difference between the zoom device 306 and the zoom device 106 consists in the field radius FR being reduced; otherwise, the system specifications are identical. This leads to a simplified system design with a reduced number of optical elements in the region of the first optical element group 308.1. Moreover, the stop space was also configured in a collimated manner.

Fourth Embodiment

A further preferred embodiment of the imaging device 101 according to the disclosure with a further preferred embodiment of the zoom device 406 according to the disclosure, by which the methods according to the disclosure can be realized, is described in the following with reference to FIGS. 1 to 3, 8 and 9. The zoom device 406 can be used in the imaging device 101 instead of the zoom device 106. In the basic design and functionality thereof, the zoom device 406 corresponds to the zoom device 106, and so the following mainly discusses the differences. Similar components are provided with a reference sign, the value of which has been increased by 300. To the extent that no other explanations in relation to the properties and advantages of these components are provided in the following, reference is explicitly made to the aforementioned explanations in respect of the first embodiment.

A substantial difference between the zoom device 406 and the zoom device 106 consists of the fact that the zoom device 406 has a constant overall axial length, i.e. there is advantageously no change in the position of the image plane 107.1 in relation to the object plane 103.3 when varying the imaging scale MOB over the complete extension (D=8×).

This is achieved (thanks to the collimated objective exit 105.3) as a result of the adjustment of the imaging scale MOB being brought about by displacing the first optical element group 408.1, the second optical element group 408.2 and the third optical element group 408.3 along the optical axis 102.1 in order to obtain, in this manner, compensation for the focal length change at a constant system length LZ of the apparatus.

The third optical element group 408.3 disposed upstream of the first optical element group 408.1 and of the second optical element group 408.2 advantageously also renders it possible here to correct the Petzval sum of the zoom device 406, i.e. eventually let it equal zero for the whole zoom device 406, such that the optical connection to the aberration-free and collimated microscope objective 105 is readily possible and leads to a plane image field in the region of the image plane 107.1, respectively.

The design of the first and second optical element groups 408.1, 408.2 as a tele arrangement 409 moreover, in a simple manner, enables the realization of large maximum focal lengths at a compact design. Therefore, high magnifications MOB and high extensions D of the imaging scale can be realized in a simple manner. In the present example, the focal length range of the zoom device 406 is once again 2.5 m to 20 m, wherein the constant axial length LZ of the zoom device 406 (along the optical axis 102.1) is LZ=2 m.

Figure 8:
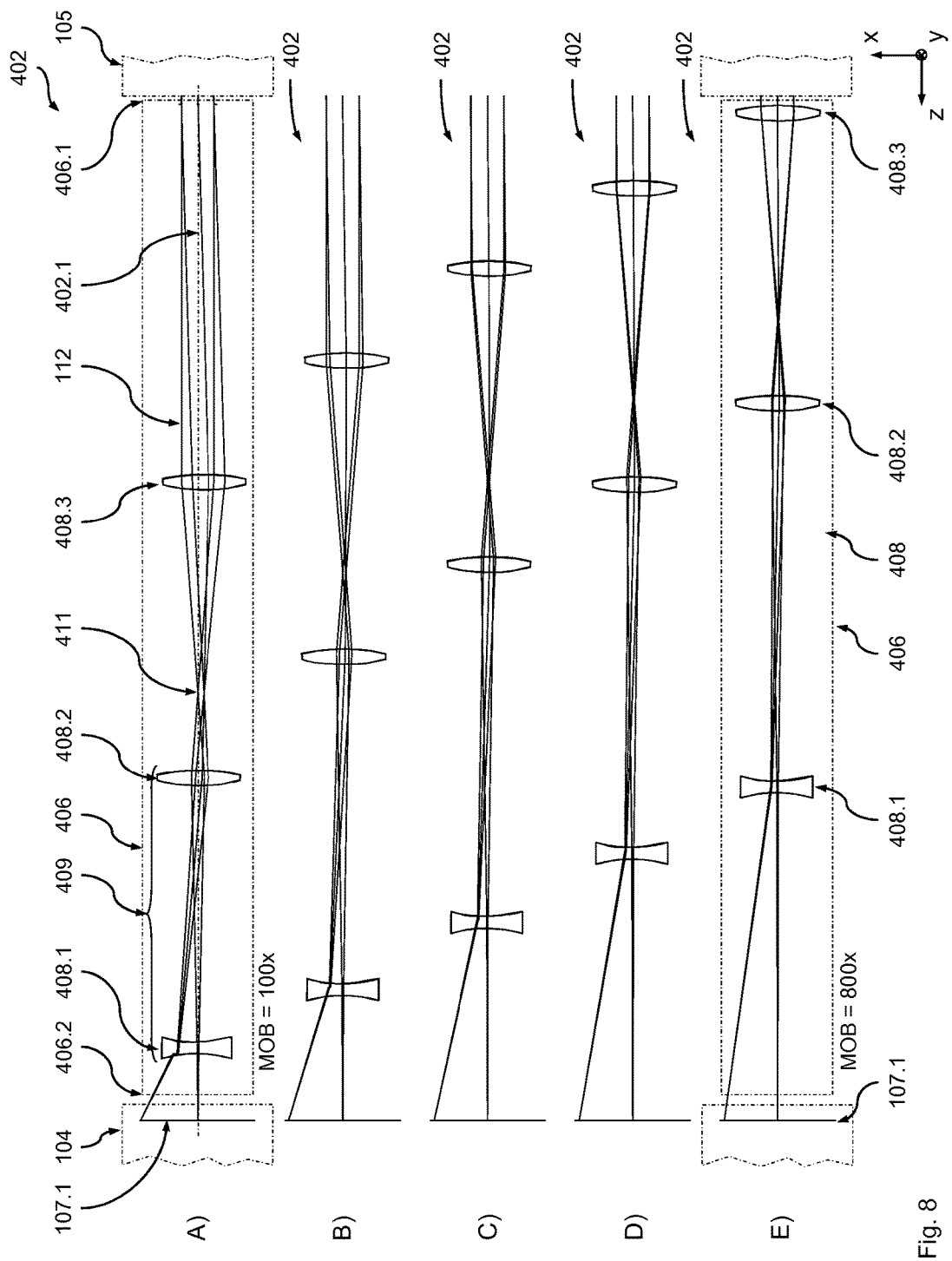
FIG. 8 is a schematic illustration of a further preferred embodiment of the zoom device according to the disclosure.

As can be seen from FIG. 8, which (as paraxial optical equivalent diagram of the optical system of the zoom device 406) in parts A to E thereof respectively shows different settings for five different imaging scales increasing from A (MOB=100×) to E (MOB=800×), the intermediate image 411, which is imaged by the tele arrangement 409 on the image plane 107.1 of the image sensor 107 and which now is axially displaceable (together with the third optical element group 408.3), is generated by the now also axially displaceable third optical element group 408.3 from the collimated light beam 112 of the microscope objective 105.

The imaging scale MOZ from the object plane 103.3 to the intermediate image 411 is once again constant in this case due to the collimation of the light beam 112.

In the present example, the extension (D=8×) is largely provided by the first optical element group 408.1. However, in other variants of the disclosure, it is also possible for the extension D again to be provided by the second optical element group 408.2 and for the first optical element group 408.1 to be arranged at a substantially constant distance from the image plane 107.1.

It is furthermore understood that the relative axial positions of the first, second and third optical element groups 408.1, 408.2, 408.3 relative to one another in the zoom device 406 may, eventually, be configured in a modifiable manner for correcting aberrations.

Figure 9:
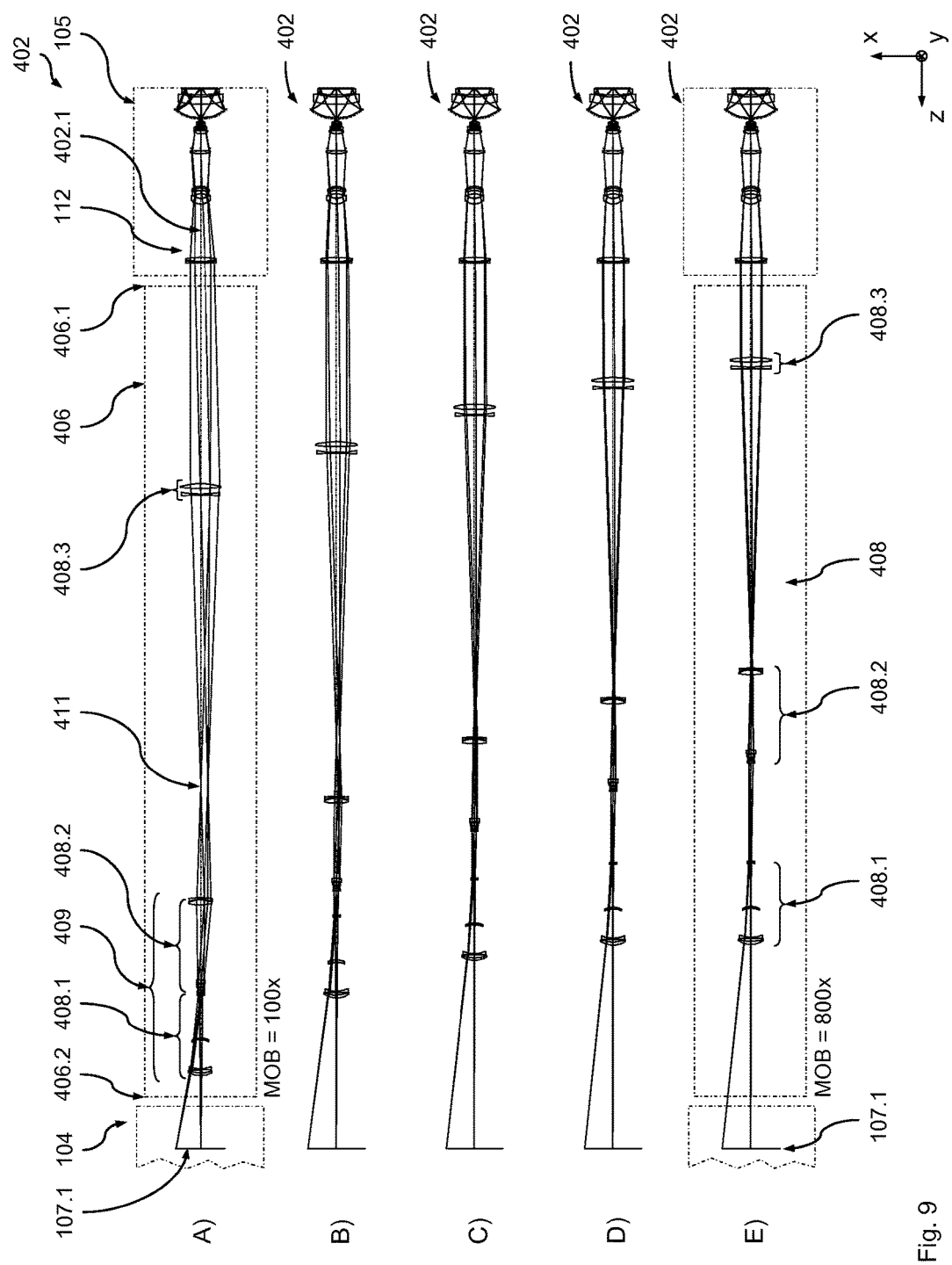
FIG. 9 is a schematic illustration of a preferred specific realization of the zoom device from FIG. 8.

In FIG. 9, the zoom concept from FIG. 8 is depicted in a specific realization.

Fifth to Seventh Embodiment

Further preferred embodiments of the imaging device 101 according to the disclosure with a further preferred embodiment of the zoom device 506 or 606 or 706, respectively, according to the disclosure, by which the methods according to the disclosure can be realized, are respectively described in the following with reference to FIGS. 1 to 3 and 10 and to FIG. 11 or 12 or 13, respectively. The respective zoom device 506 or 606 or 706 can in each case be used in the imaging device 101 instead of the zoom device 106. In the basic design and functionality thereof, the zoom device 506 or 606 or 706, respectively, corresponds to the zoom device 106, and so the following mainly discusses the differences. Similar components are provided with a reference sign, the value of which has been increased by 400 and 500 and 600, respectively. To the extent that no other explanations in relation to the properties and advantages of these components are provided in the following, reference is explicitly made to the aforementioned explanations in respect of the first embodiment.

A substantial difference between the zoom device 506 and the zoom device 106 consists of the fact that the zoom device 506 once again has a constant overall axial length, i.e. there is advantageously no change in the position of the image plane 107.1 in relation to the object plane 103.3 when varying the imaging scale MOB over the complete extension (D=8×).

This is achieved by virtue of the optical element arrangement 508 comprising a fourth optical element group 508.4 with positive refractive power, wherein this may eventually also be a single field lens element 508.4. Here, the fourth optical element group 508.4 is arranged between the now axially fixed third optical element group 508.3 and the second optical element group 508.2. Using this, it is once again possible, in a simple manner, to let the intermediate image 411 remain substantially stationary and, once again, to undertake setting of the imaging scale MOB via the first optical element group 508.1 and the second optical element group 508.2.

In the present example, the third optical element group 508.3 and the fourth optical element group 508.4 are arranged along the optical axis 102.1 at a substantially constant distance from the microscope objective 105, wherein the fourth optical element group 508.4 ensures imaging of the system pupil into the actual zoom system of the tele arrangement 509 made up of the first and second optical element groups 508.1, 508.2, which in turn realize the maximum extension (D=8×) of the imaging.

In the present example, the intermediate image 511 is arranged between the third optical element group 508.3 and the fourth optical element group 508.4, wherein the intermediate image is arranged, on the object side, in the vicinity of the region of the fourth optical element group 508.4.

However, arranging the fourth optical element group 508.4 between the intermediate image 511 and the image plane 107.1 is not mandatory. In other variants of the disclosure, it is also conceivable for the fourth optical element group 508.4 to be located on the object side of the intermediate image, i.e. between the microscope objective 105 and the intermediate image 511. Optionally, it is even possible to arrange the fourth optical element group 508.4 directly at the intermediate image 511, with this, however, then resulting in increased demands on the cleanliness of the surfaces of the optical elements of the fourth optical element group 508.4.

In the present example, the imaging scale MOB is once again adjusted by displacing the first optical element group 508.1 and the second optical element group 508.2 along the optical axis 102.1. In this manner, compensation of the change in focal length is obtained at a constant system length LZ of the apparatus. Here, the third optical element group 508.3 and the fourth optical element group 508.4 are substantially stationary.

The third optical element group 508.3 and/or the fourth optical element group 508.4 disposed upstream of the first optical element group 508.1 and of the second optical element group 508.2 once again advantageously also render it possible here to correct the Petzval sum of the zoom device 506, i.e. eventually let it equal zero for the whole zoom device 506 and/or the whole imaging unit 502, such that a plane image field emerges in the region of the image plane 107.1.

Figure 10:
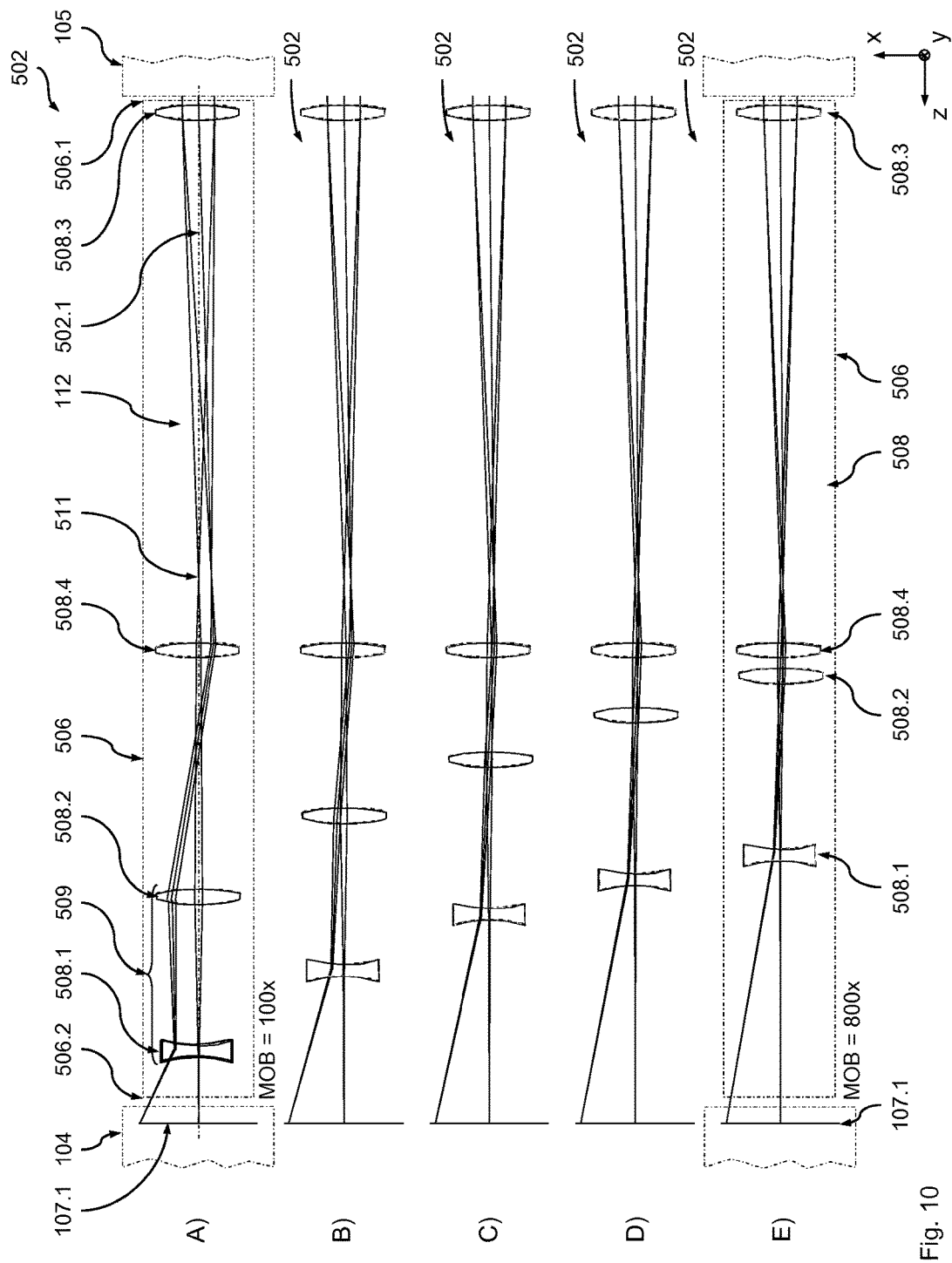
FIG. 10 is a schematic illustration of a further preferred embodiment of the zoom device according to the disclosure.

As can be seen from FIG. 10, which (as paraxial optical equivalent diagram of the optical system of the zoom device 606) in parts A to E thereof respectively shows different settings for five different imaging scales increasing from A (MOB=100×) to E (MOB=800×), in the present example, the axially stationary third optical element group 508.3, from the collimated light beam 112 of the microscope objective 105, generates the intermediate image 511, which now once again is axially stationary and is imaged by the tele arrangement 509 on the image plane 107.1 of the image sensor 107. The imaging scale MOZ from the object plane 103.3 to the intermediate image 511 is once again constant in this case due to the collimation of the light beam 112.

The substantially axially stationary arrangement of the third optical element group 508.3 and of the fourth optical element group 508.4, and therefore of the intermediate image 511, is advantageous in that, now once again, manipulations can be undertaken and/or additional beam paths can be coupled-in or coupled-out in the region of the intermediate image 511. Thus, as a result of this it is possible, for example, to integrate an autofocus system into the beam path and/or to implement measuring devices for exposure monitoring.

In the present example, the extension (D=8×) is largely provided by an axial displacement of the first optical element group 508.1 and of the second optical element group 508.2. However, it is also understood in this case that the relative axial position in the zoom device 506 of the first, second, third and fourth optical element groups 508.1, 508.2, 508.3, 508.4 with respect to one another may eventually be configured to be adjustable for correcting aberrations.

Figure 11:
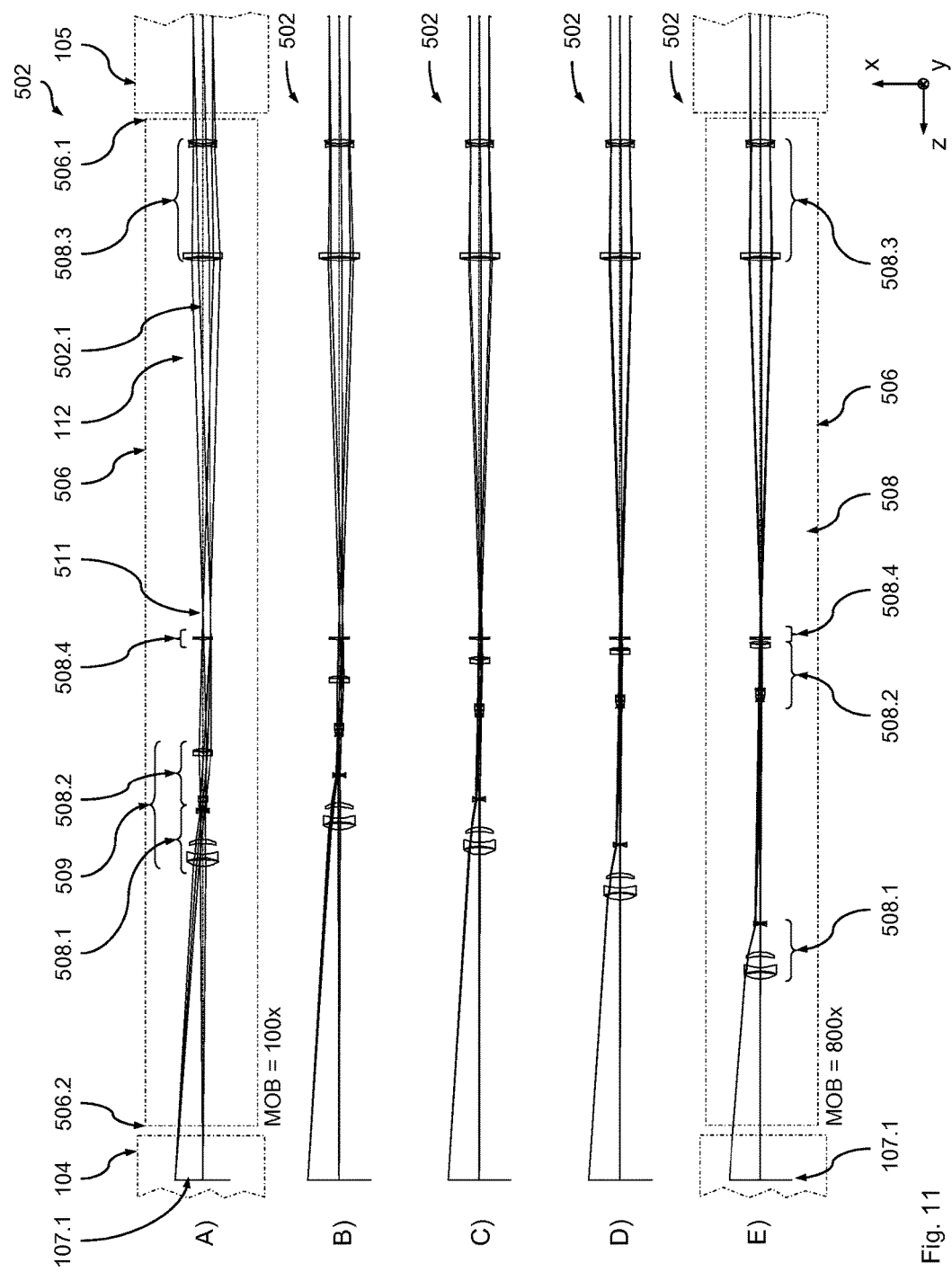
FIG. 11 is a schematic illustration of a preferred specific realization of the zoom device from FIG. 10.

FIG. 11 depicts the zoom concept from FIG. 10 in a specific realization, which has a good broadband correction for a wavelength range from 193 nm to 260 nm.

Figure 12:
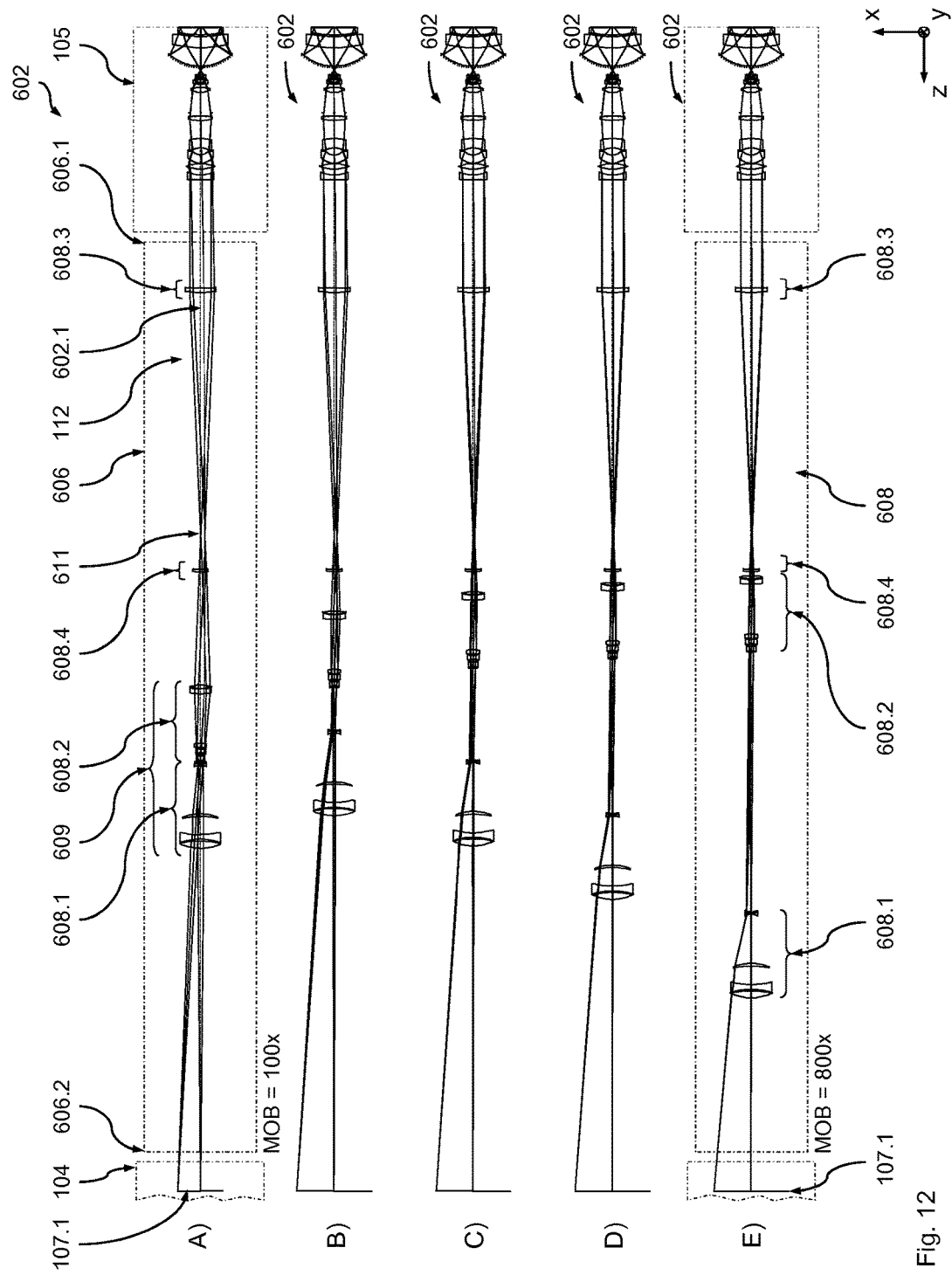
FIG. 12 is a schematic illustration of a further preferred specific realization of the zoom device from FIG. 10.
Figure 13:
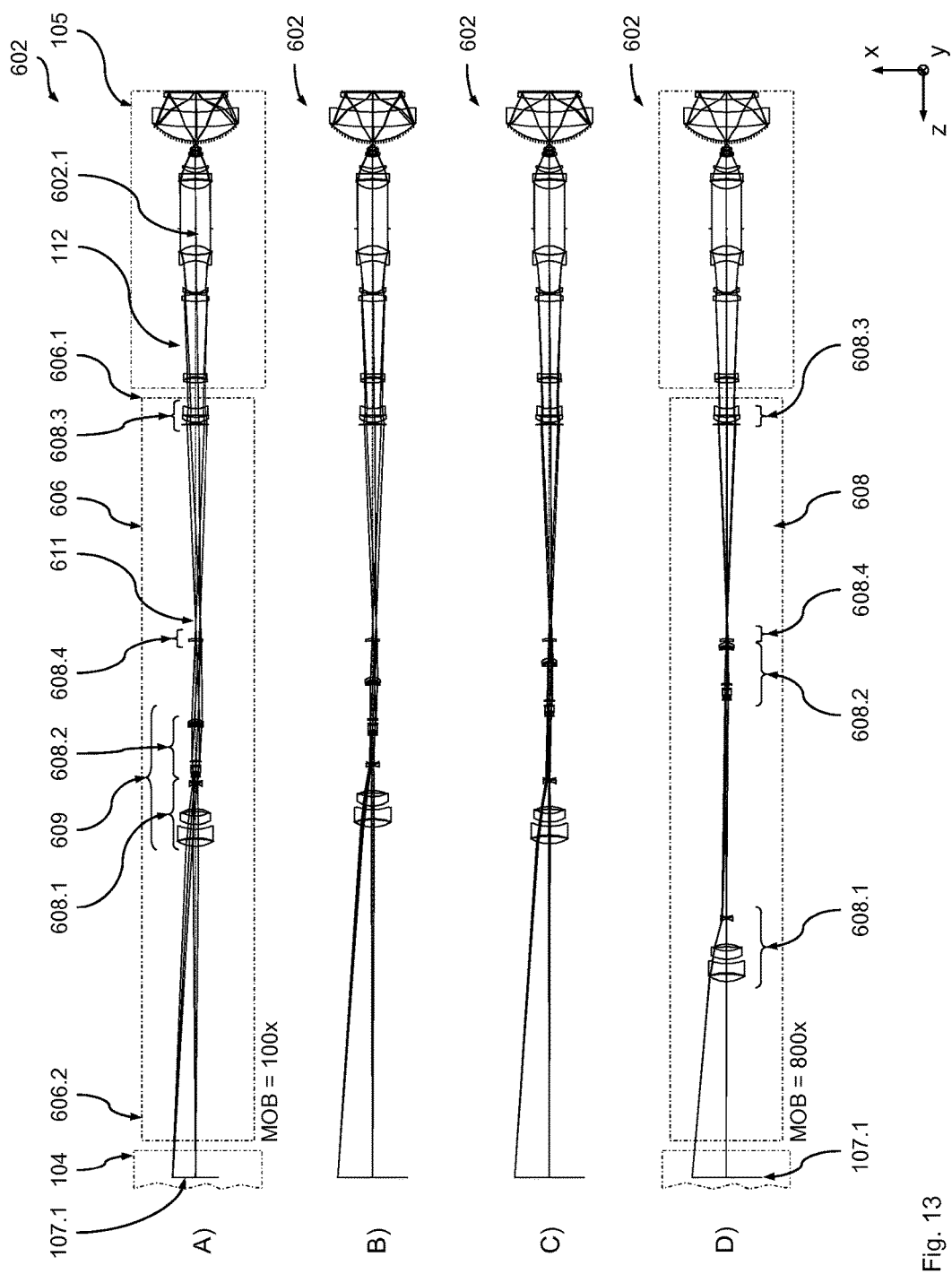
FIG. 13 is a schematic illustration of a further preferred specific realization of the zoom device from FIG. 10.

In addition to the aforementioned imaging of the system pupil, the fourth optical element group 608.4 or 708.4, arranged in the vicinity of the intermediate image, may also assume important tasks when correcting the secondary spectrum of the chromatic focus variation of the optical system in the examples from FIGS. 12 and 13 (which otherwise have a design identical to the examples from FIGS. 10 and 11). Thus, in the examples of FIGS. 12 and 13, it may be the case that the collimated light beam 112 from the microscope objective 105 is imaged into the intermediate image 611 or 711 with strong longitudinal chromatic aberration such that the beam heights of the marginal rays on the fourth optical element group 608.4 or 708.4 vary strongly as a function of the light wavelength.

As was already described at the outset, what can be achieved by such a strong longitudinal chromatic aberration of the intermediate image 611 or 711 is that the marginal ray height at the location of the fourth optical element group 608.4 or 708.4 varies significantly, and so the contribution of the fourth optical element group 608.4 or 708.4 to the longitudinal chromatic aberration is significantly different at different wavelengths. In the present example, this effect can be used by a suitable selection of the optical parameters of the fourth optical element group 608.4 or 708.4 in a targeted manner to correct higher-order chromatic aberrations, in particular to correct the secondary spectrum.

Thanks to abandoning the demand for an aberration-free interface between the catadioptric microscope objective 105 and the zoom device 606 or 706, respectively, a significantly simpler system design results, which can be realized with significantly fewer optical elements. FIG. 12 shows a specific realization of such a zoom system, which no longer has an aberration-free interface between the zoom device 606 and the microscope objective 105 and has significantly fewer lens elements compared to the system from FIG. 11.

The specific realization from FIG. 13 goes beyond the example from FIG. 12 in as much as the stop space once again has a collimated design.

In the preceding, the present disclosure was only described using an example from the field of inspecting a substrate. However, it is understood that the present disclosure can likewise be used for any other applications or imaging methods, in particular with any wavelengths of the light used for imaging.

What is claimed is:

1. An optical zoom device configured to set an imaging scale of an imaging device, the imaging device configured to image an object onto an image plane of an image recording device via a microscope objective, the optical zoom device comprising:
   an optical element arrangement comprising:
      an object-side zoom entrance optically connected to an objective exit of the microscope objective;
      an image-side zoom exit optically connected to an image recording entrance of the image recording device;
      a tele arrangement comprising:
         a first optical element group with negative refractive power, the first optical element group arranged at the image-side zoom exit, an optical element of the first optical element group being a last optical element before the image recording entrance; and
         a second optical element group with positive refractive power, the second optical element group assigned to the first optical element group to set the imaging scale, the second optical element group arranged on the objective side of the first optical element group; and
      a third optical element group with positive refractive power arranged at the object-side zoom entrance, the third optical element group configured to generate a real intermediate image in the zoom device between the third optical element group and the second optical element group,
   wherein the first optical element group is displaceable along an optical axis of the optical element arrangement to set the imaging scale.

2. The optical zoom device of claim 1, wherein the objective exit is a corrected objective exit and/or a collimated objective exit.

3. The optical zoom device of claim 1, wherein:
   the second optical element group is displaceable along the optical axis of the optical element arrangement to set the imaging scale;
   the first optical element group and the second optical element group are displaceable relative to each other; and/or the third optical element group is displaceable along the optical axis.

4. The optical zoom device of claim 1, wherein the intermediate image is:
in a region of the second optical element group; and/or
between the second and third optical element groups.

5. The optical zoom device of claim 1, wherein:
the first optical element group is arrangeable along an optical axis of the optical element arrangement at a substantially constant distance from the image recording device; and/or
the third optical element group is arrangeable along the optical axis of the optical element arrangement at a substantially constant distance from the microscope objective.

6. The optical zoom device of claim 1, wherein:
the optical element arrangement comprises a fourth optical element group between the second and third optical element groups;
the third optical element group and/or the fourth optical element group is arrangeable along an optical axis of the optical element arrangement at a substantially constant distance from the microscope objective;
the first optical element group and/or the second optical element group is displaceable along the optical axis of the optical element arrangement to set the imaging scale;
the intermediate image is between the third and fourth optical element groups; and/or
the intermediate image is arranged in a region of the fourth optical element group.

7. The optical zoom device of claim 6, wherein the fourth optical element group is configured to at least partially correct a longitudinal chromatic aberration of the intermediate image.

8. The optical zoom device of claim 1, wherein:
a Petzval sum for the optical elements of the optical element arrangement is at least approximately equal to zero;
at least some of the optical elements of the optical element arrangement comprise refractive optical elements;
the optical elements of the optical element arrangement comprise quartz glass;
the optical elements of the optical element arrangement comprise fluorspar;
an attainable extension when setting the imaging scale is 3× to 10×;
an attainable focal length range when setting the imaging scale is 1 m to 30 m; and/or
the optical element arrangement has an installation length of 1 m to 3 m along an optical axis of the optical element arrangement.

9. The optical zoom device of claim 1, wherein the tele arrangement is designed according to a teleobjective principle.

10. An optical imaging device, comprising:
an imaging unit, comprising:
a microscope objective; and
an optical zoom device according to claim 1; and
an image recording device,
wherein the imaging unit is configured to image an object onto an image plane of the image recording device.

11. The optical imaging device of claim 10, wherein:
the microscope objective is a catadioptric objective;
on its object side, the microscope objective has a numerical aperture greater than 0.8;
on its object side, the microscope objective has a field radius greater than 0.2 mm;
on its object side, the microscope objective has an etendue greater than 0.3;
the microscope objective has a further intermediate image;
at its objective exit, the microscope objective has an at least substantially collimated optical connection to the optical zoom device; and/or
at its objective exit, the microscope objective has an at least substantially corrected optical connection to the optical zoom device or has an uncorrected optical connection to the optical zoom device.

12. The optical imaging device of claim 11, wherein:
the first optical element group is the last optical element group upstream of the image recording device; and
at least one of the following holds:
the first optical element group is the last optical element group upstream of the image plane of the image recording device; and
an image detector surface of an image detector of the image recording device is in a region of the image plane of the image recording device.

13. The optical imaging device of claim 10, wherein:
the imaging unit is corrected for aberrations over a bandwidth of at least 40 nm;
the imaging unit is corrected for aberrations in an operational wavelength range from 180 nm to 400 nm; and/or
the imaging unit has an imaging scale of 40× to 1000×.

14. A method, comprising:
providing the optical zoom device of claim 1; and
generating the intermediate image between the second and third optical element groups.

15. The method of claim 14, further comprising:
displacing the first optical element group and/or the second optical element group along an optical axis of the optical arrangement to set the imaging scale;
displacing the first optical element group relative to the second optical element group;
displacing the third optical element group along the optical axis of the optical arrangement;
arranging the intermediate image in a region of the second optical element group;
arranging the intermediate image between the second and third optical element groups with a substantially constant distance ratio;
arranging the first optical element group along the optical axis of the optical element arrangement at a substantially constant distance from the image recording device; and/or
arranging the third optical element group along the optical axis of the optical element arrangement at a substantially constant distance from the microscope objective.

16. The method of claim 14, further comprising:
arranging a fourth optical element group of the optical element arrangement between the second and third optical element groups;
arranging the third optical element group and/or the fourth optical element group along an optical axis of the optical element arrangement at a substantially constant distance from the microscope objective;
displacing the first optical element group and/or the second optical element group along the optical axis of the optical element arrangement to set the imaging scale;

arranging the intermediate image between the third and fourth optical element groups; and/or arranging the intermediate image in a region of the fourth optical element group.

17. The method of claim 14, further comprising generating an image of an object onto an image plane of an image recording device via a microscope objective and an associated optical element arrangement.

18. A device, comprising:
an optical element arrangement comprising:
   an object-side zoom entrance configured to be optically connected to an objective exit of a microscope objective;
   an image-side zoom exit configured to be optically connected to an image recording entrance of an image recording device;
   a tele arrangement comprising:
      a first optical element group with negative refractive power, the first optical element group arranged at the image-side zoom exit, an optical element of the first optical element group being a last optical element before the image recording entrance; and
      a second optical element group with positive refractive power, the second optical element group assigned to the first optical element group to set an imaging scale of the image recording device, the second optical element group arranged on the objective side of the first optical element group; and
      a third optical element group with positive refractive power arranged at the object-side zoom entrance, the third optical element group configured to generate a real intermediate image in the zoom device between the third optical element group and the second optical element group,
   wherein the device is an optical zoom device configured to image an object onto an image plane of the image recording device via the microscope objective, and the first optical element group is displaceable along an optical axis of the optical element arrangement to set the imaging scale.

19. An optical imaging device, comprising:
an image recording device; and
an imaging unit, comprising:
   a microscope objective; and
   an optical zoom device, comprising:
      an optical element arrangement comprising:
         an object-side zoom entrance optically connected to an objective exit of the microscope objective;
         an image-side zoom exit configured to be optically connected to an image recording entrance of the image recording device;
         a tele arrangement comprising:
            a first optical element group with negative refractive power, the first optical element group arranged at the image-side zoom exit, an optical element of the first optical element group being a last optical element before the image recording entrance; and
            a second optical element group with positive refractive power, the second optical element group assigned to the first optical element group to set an imaging scale of the image recording device, the second optical element group arranged on the objective side of the first optical element group; and
            a third optical element group with positive refractive power arranged at the object-side zoom entrance, the third optical element group configured to generate a real intermediate image in the zoom device between the third optical element group and the second optical element group,
         wherein the first optical element group is displaceable along an optical axis of the optical element arrangement to set the imaging scale.

20. A method, comprising:
providing the optical imaging device of claim 19; and
generating the intermediate image between the second and third optical element groups.

21. An optical zoom device configured to set an imaging scale of an imaging device, the imaging device configured to image an object onto an image plane of an image recording device via a microscope objective, the optical zoom device comprising:
an optical element arrangement comprising:
   an object-side zoom entrance optically connected to an objective exit of the microscope objective;
   an image-side zoom exit optically connected to an image recording entrance of the image recording device;
   a tele arrangement comprising:
      a first optical element group with negative refractive power, the first optical element group arranged at the image-side zoom exit, an optical element of the first optical element group being a last optical element having refractive power before the image recording entrance; and
      a second optical element group with positive refractive power, the second optical element group assigned to the first optical element group to set the imaging scale, the second optical element group arranged on the objective side of the first optical element group; and
   a third optical element group with positive refractive power arranged at the object-side zoom entrance, the third optical element group configured to generate a real intermediate image in the zoom device between the third optical element group and the second optical element group,
wherein the first optical element group is displaceable along an optical axis of the optical element arrangement to set the imaging scale.

* * * * *

UNITED STATES PATENT AND TRADEMARK OFFICE
CERTIFICATE OF CORRECTION

PATENT NO. : 10,422,985 B2
APPLICATION NO. : 14/533211
DATED : September 24, 2019
INVENTOR(S) : Alexander Epple and Holger Muenz Page 1 of 1

It is certified that error appears in the above-identified patent and that said Letters Patent is hereby corrected as shown below:

In the Claims

Column 16, Line 47, Claim 1, delete "obj ective" and insert -- objective --, therefor.

Signed and Sealed this
Fourteenth Day of April, 2020

Andrei Iancu
*Director of the United States Patent and Trademark Office*